United States Patent Office

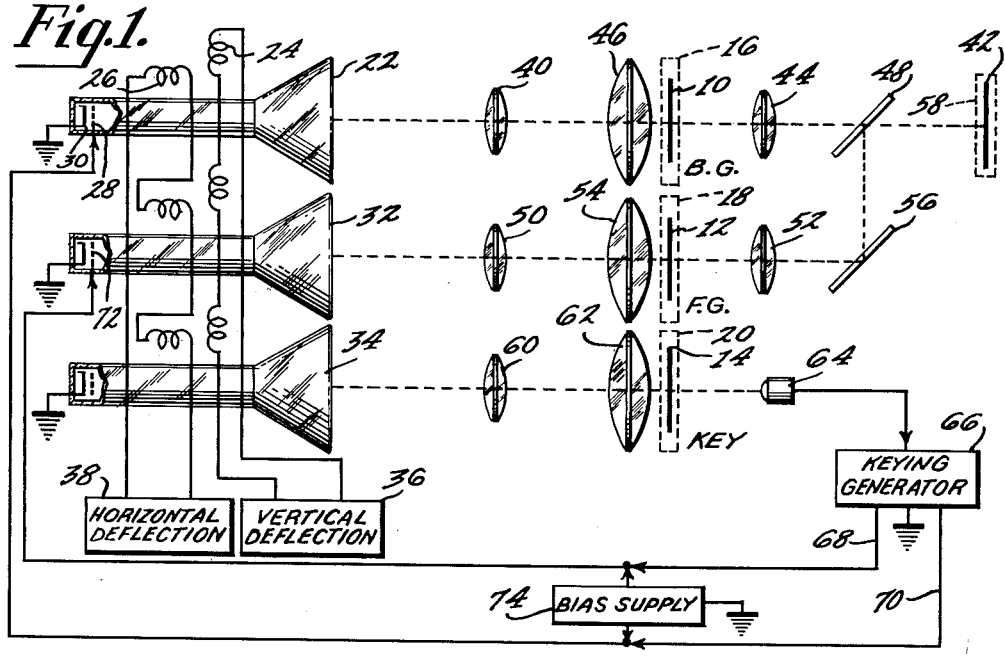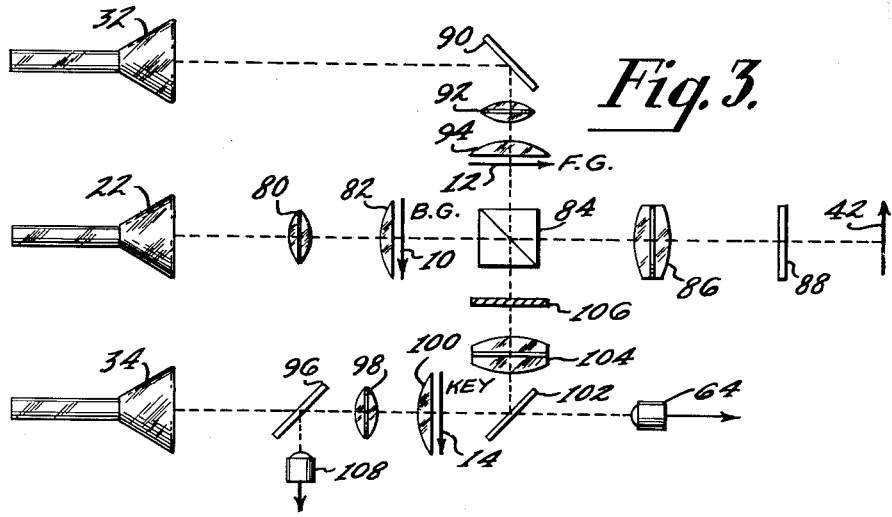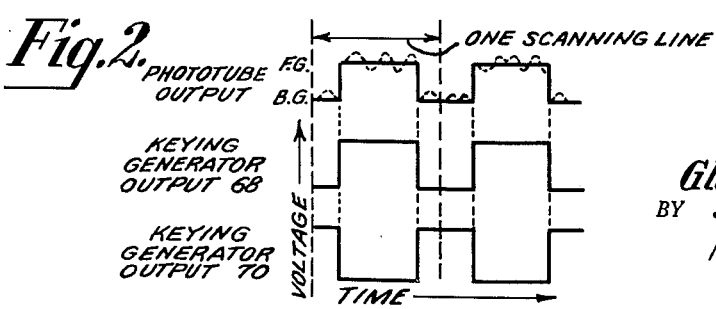

2,985,064
Patented May 23, 1961

2,985,064

COMPOSITE PHOTOGRAPHY

Glenn L. Dimmick, Haddon Heights, N.J., assignor to Radio Corporation of America, a corporation of Delaware Filed Mar. 15, 1957, Ser. No. 646,321

7 Claims. (Cl. 88—24)

This invention relates to systems for making a composite photograph from a plurality of photographs.

Various forms of motion-picture composite photography are described in the article "Some Special Photographic Effects Used in Motion-Picture Production," by Kellogg and Abbott, in the "Journal of the Society of Motion Picture and Television Engineers," vol. 64, February 1955, page 57. One form of such composite photography is known as the traveling-matte process. This traveling-matte process affords a system for combining a foreground, or action, photograph with a background photograph.

A feature of this invention is the use of scanning illumination techniques for making composite photograpss such as the traveling-matte composites.

It is among the objects of the invention to provide:
A new and improved composite photography system;
A new and improved traveling-matte composite photography system;
A new and improved composite photography system employing scanning illumination techniques; and
A new and improved composite photography system employing electronic scanning techniques.

In accordance with this invention, a system for producing a composite photograph from a plurality of photographs includes a system for directing a moving light to the plurality of photographs to be modified thereby, and a means responsive to the light modified by one of the photographs for controlling the exposing of the composite photograph with modified light.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 1 is a schematic block and optical diagram of a composite photography system embodying this invention;

Figure 2 is an idealized graph of the time relationships of waveforms that may occur in certain portions of the system of Figure 1; and Figure 3 is a schematic block and optical diagram of a modification of the system of Figure 1.

In the composite photography system shown in Figure 1, three input photographs 10, 12, and 14 are shown. The first film is sometimes designated a background (B.G.) film in composite photography. The second film is sometimes designated the foreground (F.G.), or action, film. The foreground film 12 may be photographed with the action appearing against a certain backing. This backing provides in the film 12 a "surround" to the action, which surround has an optical characteristic clearly distinct from the action image area. In this way, there is provided a clear border around the foreground action in the film 12. The third film 14 is a key film which clearly indicates the border region of the foreground film 12. The action region and surround region in the key film 14 should be distinct. In the system of Figure 1, the films 10, 12, and 14 are photographic transparencies. With such photographic transparencies, the key film should provide two distinct transmission regions for the action and background, respectively. The distinction in this key film 14 may be either spectral or neutral. For example, the key film 14 may be a light silhouette of the action against a dark background.

Three printer projector heads 16, 18, and 20 are provided for the films 10, 12, and 14, respectively. These heads 16, 18, and 20 each include a film transport system for positioning the films in suitably registered positions.

The background film 10 is scanned by means of a flying-spot cathode ray tube 22. This tube 22 has vertical and horizontal deflection coils 24 and 26 and a suitable electron gun that includes a control electrode 28 and a cathode 30. Light is directed to the foreground film 12 and the key film 14 by means of similar cathode ray tubes 32 and 34, respectively. The vertical deflection coils of these three cathode ray tubes 22, 32, and 34 are energized from a common vertical deflection generator 36, and the corresponding horizontal deflection coils are energized from a horizontal deflection generator 38. With this deflection arrangement and by suitable common power supplies (not shown) for the electron guns, each line of the rasters of the three tubes 22, 32, and 34 may be arranged to be synchronous and in registration.

Light from the screen (not shown) of the cathode ray tube 22 is directed by an imaging lens 40 to the film 10. The background film 10 is imaged onto a sensitized photographic film 42 by means of an imaging lens 44. A field lens 46 images the lens 40 at the lens 44. A partially transmitting mirror is interposed to allow an optical combination with the foreground imaging system. The lenses 50, 52, and 54 in the foreground film imaging system perform similar functions to the lenses 40, 44, and 46, respectively. A plane mirror 56 is used with the partially transmitting mirror 48 to image the foreground film 12 onto the unexposed film 42. A suitable camera 58 for the unexposed film 42 has a gate transport system operated in synchronism and registery with those of the printer heads 16, 18 and 20.

In the key-film optical channel, an imaging lens 60 directs the light from the screen of the cathode ray tube 34 to the key film 14, and a field lens 62 images the light at the lens 60 onto the face of a phototube 64. The output of the phototube 64 is applied to a keying generator 66 via an amplifier (not shown). The keying generator 66 is a circuit that provides two different voltage levels at the outputs 68 and 70 which are respectively connected (for example, to the grids 28 and 72) to modify the grid-cathode voltages of the tubes 22 and 32. A bias voltage supply 74 for these grid-cathode circuits is also connected to these grids 28 and 72. Standard techniques for blanking the beam of the tube 22 on each horizontal and vertical deflection retrace may be used.

The generator 66 may take different forms; for example, this generator 66 may be a Schmitt trigger circuit which assumes two stable conditions in response to input voltage amplitudes in two distinct ranges. For one of these two trigger-circuit conditions, the voltage levels at the outputs 68 and 70 are such that the cathode ray tube 22 is turned on and the cathode ray tube 32 is turned off. For the other such condition, the reverse conditions in the tubes 22 and 32 are brought about.

Reference is made to the idealized graph of Figure 2 to describe certain time relationships in the operation of the system of Figure 1. For purposes of description, suppose that the key film 14 has a low density (high transmission) in the foreground regions, and a high density (low transmission) in the background regions. Under such circumstances, as shown in Figure 2, the output of the photocell 64 is a low voltage level in the background regions and a high voltage level in the foreground regions. If the key film 14 is in the nature of a silhouette with uniform densities in the two regions corresponding to foreground and background, the photocell output is either of two voltage levels corresponding respectively to the foreground and background regions. The key film 14 may also have picture information in either or both foreground and background regions; under such circumstances, the photocell output would be in the form of two non-overlapping voltage ranges corresponding respectively to the non-overlapping ranges of density in the foreground and background regions. Possible photocell outputs for this latter situation are shown in broken lines in Figure 2.

The cathode ray tube 34 scanning the key film 14 produces two voltage levels at the output of the photocell 64 as it traverses a line of the key film 14 that crosses both foreground and background regions. The waveforms for two such scanning lines are shown in Figure 2. In the background region, the photocell output applied to the keying generator 66 (under the conditions set forth by way of example) is such that the voltage at the output 70 is relatively high and the voltage at the output 68 is relatively low. With these generator output voltages, the cathode ray tube 22 is turned on and the cathode ray tube 32 is turned off. Thus, as the background region of the key film 14 is scanned, the corresponding parts of the background film 10 are illuminated by the scanning light spot from the cathode ray tube 22, and the corresponding parts (the surround) of the foreground film 12 are not illuminated. Accordingly, the illuminated part of the background film 10 is imaged on the unexposed photographic film 42 to expose that portion of the film 42.

When the scanning light spot from the screen of the cathode ray tube 34 moves across the border between the background and foreground regions of the key film 14, the photocell output changes to a relatively high voltage level to trigger the generator 66 to the reverse condition. At this time, the voltages at the outputs 68 and 70 are such that the foreground cathode ray tube 32 is turned on and the background cathode ray tube 22 is turned off. As a result of the synchronous operation of the tubes 32 and 34 and the optical registration of the foreground film 12 and the key film 14, the scanning light spot of the cathode ray tube 32 is directed across the border into the foreground region at the same time that the scanning light spot from the cathode ray tube 34 moves across the border into the foreground region of the key film 14. The illuminated portion of the foreground film 12 is imaged on the photographic film 42 to expose the corresponding portions of that film 42. The background film 10 is not illuminated at that time, and, therefore, portions of that background film corresponding to the foreground are omitted from the composite exposure on the film 42. Accordingly, the foreground exposure on the composite film 42 appears to be in front of the background exposure on that film 42.

When the scanning light spot of the cathode ray tube 34 imaged on the key film 14 moves back across the border of the foreground region into the background region, the output of the photocell 64 is such that the generator 66 is triggered back to turn on the background cathode ray tube 22 and turn off the foreground cathode ray tube 32. Accordingly, in raster positions of the key light spot, in which it is imaged on the surround, the light spot of the tube 22 is extinguished, and the surround of the foreground film 12 is not illuminated. However, the corresponding portion of the background film 10 is again illuminated. Accordingly, the portions of the background film that should surround the foreground image are again imaged on the composite film 42 to expose that film.

This operation is repeated in a similar manner with each successive scanning line as indicated in the graph of Figure 2. Depending upon the subject matter of the foreground film 12, which determines the keying effects of the key film 14, there may be a plurality of switching operations of the type described above with respect to Figure 2, or there may be no switching operation in a particular line, the exposure for that particular line being either all foreground or all background. Thus, with the complete scanning of the films 10, 12, and 14 a composite film is exposed that has effectively a foreground image inserted in front of a background image.

In certain applications, the input films may not be describable as "foreground" and "background." However, the image of one of the input films is to be inserted in front of the image of the other. The border of the image to be inserted is used as the key image that controls the switching operation.

With the system of Figure 1, there are no optical limitations in the surround region of the foreground film 12 except as limitations may be necessary to provide a suitable foreground film for making a key film 14. The input films 10 and 12 may be black and white transparencies and either positives or negatives depending upon the requirements of a particular system. The composite film 42 for such inputs is likewise a black and white film and the photographic reverse of the input. The input films 10 and 12 may also be color transparencies. The composite film 42 is then either a black and white separation or a color positive from a color negative, depending upon the photographic printing system employed. If the distinction between the foreground and background regions in the key film 14 are spectral, then a suitable filter (not shown) may be needed between the key film 14 and the photocell 64. Where the scanned films have spectral characteristics, the spectral characteristics of phosphors in an illuminating cathode ray tube screen become significant. Among the known techniques for deriving a suitable key film is the exposure of an ultraviolet sensitive film (together with the exposure of the foreground film) of the foreground scene in front of a screen backlighted with ultraviolet light.

The cathode ray tubes 22 and 32 are used only as sources of illumination for optically imaging portions of the two input film images into a single composite image. Thus, there is no resolution limitation imposed by the size of the scanning light spot except in the vicinity of the border of the foreground image. The effect of the finite scanning spot size may be to reduce somewhat the sharpness of the boundary line. The keying response from fine border detail depends upon the phosphor decay time, spot size, and scanning rate. Since the key cathode ray tube 34 is used to generate an electronic switching signal, its phosphor should have a relatively fast decay. The illuminating tubes 22 and 32 may each have a relatively slow decay time, one within the order of time for changing film frames. In other optical and physical characteristics, all three tubes should be the same to maintain raster registration.

In the modification of Figure 3, substantially identical optical trains are provided for the light from the background cathode ray tube 22 and the foreground cathode ray tube 32. In Figure 3, parts corresponding to those previously described are referenced by the same numerals.

The background cathode ray tube 22 is followed by an optical train that includes an objective lens 80, a condenser lens 82, the background film 10, a splitter cube 84, an objective lens 86, a filter 88 (if colored input films are employed and composite color separations are the outputs), and the composite output film 42. The foreground cathode ray tube 32 is followed by an optical train that includes a plane mirror 90, an objective lens 92, a condenser lens 94, and the foreground film 12. The remainder of the foreground optical train (the splitter cube 84, the objective lens 86, and filter 88) is common to both the foreground and background optical trains. The cathode ray tubes 22 and 32 have identical orientations, as do the scanning spots across the screens of these two tubes.

The keying cathode ray tube 34 is follower by an optical train that is similar to the other two, which train includes a pellicle 96, or a semi-transparent mirror, an objective lens 98, a condenser lens 100, the key film 14, a semi-transparent mirror 102, and an objective lens 104. A shutter 106 is positioned between the objective lens 104 and the splitter cube 84, the shutter 106 being shown in the closed condition in Figure 3. The phototube 64 receives light passing through the semi-transparent mirror 102. Another phototube 108 receives light reflected by the pellicle 96. The objective 104 is generally similar to the objective 86, and the pellicle 96 may be made sufficiently thin so as not to impair the similarity of the optical trains.

In operation, the system of Figure 3 is similar to that of Figure 1. Scanning light spots on the screens of the cathode ray tubes 22 and 32 are respectively imaged upon the background and foreground films 10 and 12 by exactly similar optical elements. The background and foreground films 10 and 12 are imaged in the same plane, the plane of the composite film 42, by the common optical train that includes the splitter 84, the objective 86, and filter 88.

In the splitter cube 84, half the light from the background film 10 and half the light from the foreground film 12 is directed into the objective lens 104 (when the shutter 106 is opened). This objective 104 brings the images of the background and foreground films 10 and 12 into focus in the plane of the key film 14, where the images of these films 10 and 12 have the identical relative positions of the images at the composite film 42 due to precise construction of the splitter cube 84.

The scanning rasters of the three tubes 22, 32, and 34 may be registered by means of a reticle inserted in the position of the key film 14. The scanning rasters of the tubes 22 and 32 are imaged on this reticle (in the plane of the key film 14) when the shutter 106 is opened. This scanning light passes through the objective 98, and part of it is removed to the phototube 108 by means of the pellicle 96. The output of this phototube 108 may be fed into a television monitor (not shown), on whose screen images of the reticle due to the scanning light from the phototubes 22, 32 appear. The scanning characteristics of the tubes 22 and 32 may be then adjusted until only a single image of the reticle in the plane of the key film 14 is seen on such a monitor. This single-image condition insures precise registration of the scanning rasters at the plane of the composite film 42 throughout the entire cycle of scan.

The keying tube 34 is also sharply focused on this reticle in the plane of the key film 14. The scanning of such a reticle by the scanning spot of the tube 34 may be detected by the phototube 64, and this phototube's output may be applied to the same television monitor as the output of the phototube 108. The output of the phototube 64 may be made to appear on the same monitor simultaneously with the output of the phototube 108 due to scanning action of either or both of the tubes 22 and 32. The scanning properties of the keying tube 34 may be adjusted under these conditions until only a single image of the reticle appears on the monitor. Under the condition of a single image, the scanning spots of all three tubes 22, 32, and 34 are in precise register throughout the scanning raster as required. Pellicle 96 can be removed during the exposure of the composite film 42 and reinserted during the registration operation.

During the printing operation in which the composite film 42 is exposed, the shutter 106 is closed. The operation is generally similar to that described above with respect to Figure 1. The key film 14 is scanned by light from the keying cathode ray tube to provide keying signals via the phototube 64. The keying signals are used to turn on one of the tubes 22 and 32 and to turn off the other. In this way, the composite film 42 is exposed with the image of the background film 10 except in regions in which the foreground is to be inserted, and in those regions the composite film 42 is exposed with the foreground image.

Related composite photography systems are described in the copending patent applications Serial No. 646,340 by H. E. Haynes, Serial No. 646,338 by H. E. Haynes and F. L. Putzrath, and Serial No. 646,265 by F. L. Putzrath, all filed concurrently herewith on March 15, 1957.

In accordance with this invention, a new and improved composite photography system is provided. Scanning illumination techniques are used for making composite photographs such as traveling-matte composites.

What is claimed is:

1. In a system for exposing a photographic element as a composite of a plurality of photographic transparencies, the combination comprising a plurality of cathode ray tube scanning means each associated with a different one of said transparencies for providing moving illuminating light, means for imaging two of said photographic transparencies on said element so that the moving light from the associated scanning means may be directed through said two transparencies to expose said element, and means responsive to light through a third one of said transparencies for turning on and off the light of said scanning means associated with said two transparencies to permit exposure of each area of said element by light corresponding to the same relatively positioned portion of each of said two transparencies at mutually exclusive times.

2. In a system for exposing a composite photographic element from a plurality of photographic transparencies, the combination of means for imaging each of said transparencies on said element, means for directing a moving light through said plurality of transparencies, means for optically imaging said light in a plane of a certain one of said transparencies, and means responsive to light through said certain one of said transparencies for controlling the directing to said element of light associated with said certain transparencies to expose said element with light from said transparencies at mutually exclusive times.

3. In a system for exposing a photographic composite element from a plurality of photographic records, the combination of means for imaging each of said photographic records on said element, means including said last mentioned means for directing a light beam from each of said photographic records and modified thereby to expose said element, and separate means for impressing said records with said light beam at mutually exclusive times, said means including a photographic record for controlling the said mutually exclusive times.

4. A system in accordance with claim 3 in which said photographic records are photographic transparencies.

5. In a system for exposing a photographic composite element from a plurality of photographic records, the method comprising the steps of imaging each of said photographic records on said element, exposing said element a line at a time by directing a moving light beam modified by one of said records, and exposing said composite a line at a time by a light beam modified by both of said records at mutually exclusive times.

6. A method in accordance with claim 5 in which said photographic records are photographic transparencies and said exposing light is directed through said transparencies.

7. In a system for exposing a photographic element as a composite of a plurality of photographic transparencies, the combination of a plurality of flying-spot scanning means, one of said flying spots being impressed on each of said transparencies, means for imaging certain of said transparencies on said element, said means including means for directing said flying spots to said element, and means including another of said transparencies for selecting the flying spot being directed to said other transparencies for exposing said element to different portions of said transparencies at mutually exclusive times.

References Cited in the file of this patent

UNITED STATES PATENTS

| | | |
|---|---|---|
| 2,073,370 | Goldsmith | Mar. 9, 1937 |
| 2,164,297 | Bedford | June 27, 1939 |
| 2,172,936 | Goldsmith | Sept. 12, 1939 |
| 2,744,443 | Higonnet | May 8, 1956 |
| 2,752,818 | Gehring | July 3, 1956 |

FOREIGN PATENTS

| | | |
|---|---|---|
| 489,644 | Italy | Jan. 25, 1954 |
| 701,884 | Great Britain | Jan. 6, 1954 |